United States Patent [19]
Krigmont et al.

[11] Patent Number: 5,233,934
[45] Date of Patent: Aug. 10, 1993

[54] CONTROL OF NOX REDUCTION IN FLUE GAS FLOWS

[75] Inventors: Henry V. Krigmont, Seal Beach; Wayne R. Kozacka, Laguna Hills; Felix E. Spokoyny, Costa Mesa, all of Calif.

[73] Assignee: Wahlco Environmental Systems, Inc., Santa Ana, Calif.

[21] Appl. No.: 933,488

[22] Filed: Aug. 20, 1992

[51] Int. Cl.$^5$ .............................................. F23D 15/00
[52] U.S. Cl. ........................................ 110/345; 165/7; 422/171; 422/172; 423/235; 423/239.1
[58] Field of Search ................. 110/344, 345; 423/235, 423/237, 239; 422/171, 172, 181; 165/5, 7

[56] References Cited

U.S. PATENT DOCUMENTS

| | | |
|---|---|---|
| 4,867,953 | 9/1989 | Riekert et al. |
| 4,978,514 | 12/1990 | Hofmann et al. |
| 5,047,219 | 9/1991 | Epperly et al. |
| 5,047,220 | 9/1991 | Polcer ................................ 423/239 |
| 5,057,293 | 10/1991 | Epperly et al. |
| 5,145,652 | 9/1992 | Veser et al. ........................ 422/171 |

OTHER PUBLICATIONS

M. Kotter et al., "Selective catalytic reduction of nitrogen oxides-an original concept," *International Chemical Engineering*, vol. 31, No. 4, pp. 685-692 (Oct. 1991).

*Primary Examiner*—Edward G. Favors
*Attorney, Agent, or Firm*—Gregory O. Garmong; Howard E. Sandler

[57] ABSTRACT

The NOx content in a flow of flue gas is reduced by passing the flue gas through a first treatment zone and a second treatment zone. A nitrogeneous treatment agent is introduced into the first treatment zone for the selective non-catalytic reduction of part of the NOx, and the flue gas is thereafter passed through the second treatment zone which includes a catalyst for further selective catalytic reduction of the NOx. Optionally, a second nitrogeneous treatment agent is added to the flue gas in the second treatment zone. The quantity of NOx in the flue gas is detected intermediate the first and second treatment zones and, optionally, after the flue gas has left the second treatment zone. The quantity of ammonia in the flue gas exiting from the second treatment zone is also detected. The amounts of the treatment agents added to the flue gas are controlled responsive to the variations and absolute levels determined by these measurements.

27 Claims, 6 Drawing Sheets

CONTROL OF NOX REDUCTION IN FLUE GAS FLOWS

BACKGROUND OF THE INVENTION

This invention relates to the reduction of pollutants produced by boilers, and, more particularly, to the control of the process for reducing NOx pollutants in flue gas flows.

In a fossil-fuel power plant, coal, gas, or oil is burned to boil water to form steam. The steam drives a turbine and thence an electric generator, producing electricity. Besides heat, the combustion produces gaseous pollutants such as sulfur and nitrogen oxides, and a solid particulate termed fly ash. Environmental protection laws mandate that the amounts of the gaseous and solid pollutants be maintained at acceptably low levels. The present invention deals with reducing and maintaining the smog-producing nitrogen oxides, known generally as NOx, within acceptable levels.

It is known that the NOx level in flue gas is lowered by reacting the NOx with ammonia, to produce harmless nitrogen and water as reaction products. The reaction can occur at relatively high temperatures without a catalyst, or at lower temperatures in the presence of a catalyst. The former is known in the art as selective non-catalytic reduction (SNCR), and the latter is known as selective catalytic reduction (SCR). In a process modification, both SNCR and SCR may be performed simultaneously on the same flue gas stream. The SNCR is accomplished in a first zone shortly after the hot flue gas leaves the furnace, and the SCR in a second zone through which the cooler flue gas subsequently passes.

Ammonia must be present for both SNCR and SCR reactions to occur. Since providing a sufficient amount of gaseous or liquid ammonia for both reactions is expensive, the required ammonia molecules may be provided by introducing a nitrogenous compound such as urea into the hot flue gas in the first treatment zone. The urea decomposes at high temperatures, providing ammonia for the SNCR reaction. The urea is usually added in excess of that required for the SNCR reaction, and the SCR helps to remove the resulting excess ammonia from the flue gas stream. Additional nitrogenous compounds or ammonia itself can be added to the flue gas at the second treatment zone, if required to complete the SCR reaction.

Although SNCR and SCR are generally effective in reducing NOx content of the flue gas, the addition of ammonia leads to another potential source of pollution. If the ammonia introduced into the flue gas is not entirely consumed in the reactions with NOx, some ammonia remains in the flue gas and passes to the atmosphere, a consequence termed "ammonia slip". Ammonia slip is often observed in the exhaust plumes of those power plants that use SNCR or SCR to reduce the NOx content of the flue gas.

There is a need for some approach to achieving reduction of NOx in flue gas to acceptably low limits, and also maintaining ammonia slip below the regulatory limits. The present invention fulfills this need, and further provides related advantages.

SUMMARY OF THE INVENTION

The present invention provides a method for reducing the NOx content in a flow of flue gas, and simultaneously maintaining the ammonia slip within acceptable limits. The present approach provides a control method that operates in an iterative manner to achieve its objectives, and can therefore adjust to changes in operating characteristics of the boiler. Minimal modification to the power plant is required in order in implement the approach.

In accordance with the invention, a method of reducing NOx from a flow of flue gas produced by a burner comprises the steps of passing the flue gas through a first treatment zone, and, substantially simultaneously with said passing, selectively introducing a nitrogeneous treatment agent into the first treatment zone for the selective non-catalytic reduction of a first portion of the NOx from the flue gas passing through the first treatment zone. The nitrogeneous treatment agent is introduced in an excessive amount above that required for the non-catalytic reduction of the first portion. The method further involves passing the flue gas, containing such excessive amount of treatment agent, through a second treatment zone which includes a catalyst therein wherein a second portion of the NOx within the flue gas is removed as a result of a reaction of the NOx with such excessive treatment agent in the presence of the catalyst. Optionally, a second nitrogeneous treatment agent can be introduced into the flue gas in the second treatment zone. The quantity of NOx in the flue gas is detected intermediate the first and second treatment zones, and, optionally, after the flue gas leaves the second treatment zone. The quantity of ammonia is detected in the flue gas exiting from the second treatment zone.

The quantities of the addition of the treatment agent and second treatment agent are varied according to the results of the NOx and ammonia measurements. The quantity of treatment agent introduced into the first treatment zone is increased so long as the following criteria are met: First, that the quantity of NOx measured between the first and second treatment zones, over a period of time, is generally decreasing with an increasing addition of the treatment agent, and, second, that the quantity of ammonia detected in the flue gas leaving the second treatment zone, over a period of time, is generally below a predetermined maximum limit. The second treatment agent is introduced into the flue gas so long as the following criteria are met: First, that the quantity of NOx measured between the first and second treatment zones, over a period of time, is not generally decreasing as a result of a further addition of the treatment agent, and, second, that the quantity of ammonia detected in the flue gas after it leaves the second reaction zone (the ammonia slip), over a period of time, is generally below a predetermined maximum limit. The addition of the second treatment agent can be increased as long as the quantity of NOx measured after the flue gas leaves the second treatment zone has not substantially reached a predetermined target control point.

This approach is preferably implemented in an incremental, iterative control procedure that adjusts the addition rates of the treatment agents responsive to the measurements of the NOx and ammonia in the flue gas. It can be applied to various types of power plants, both as an initial installation and as a retrofit to boilers to improve their operational characteristics. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
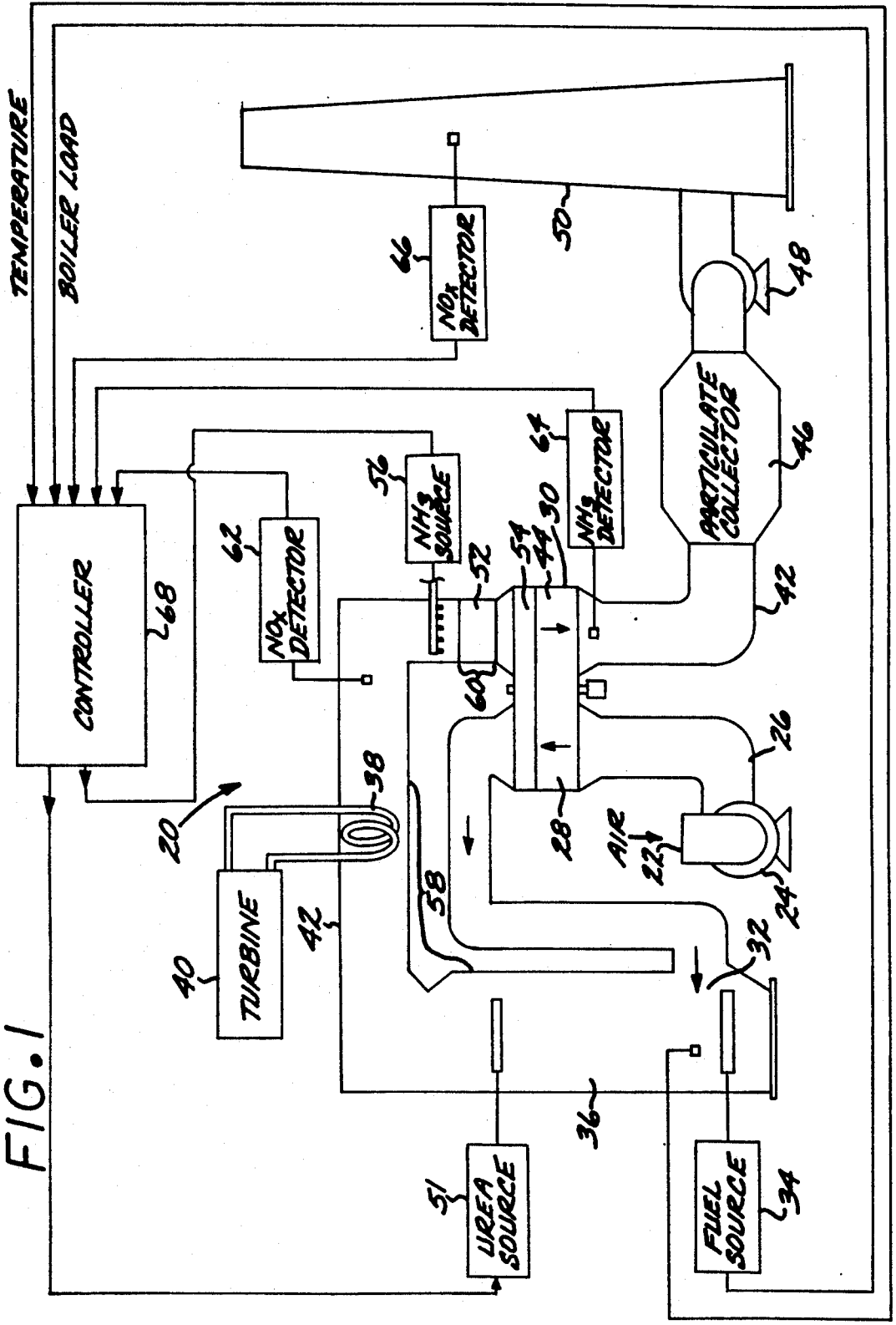
FIG. 1 is a schematic drawing of a power plant.

FIG. 1 depicts a power plant 20 in which fossil fuel such as coal, gas, or oil is combusted with air. Air is drawn into an intake 22 by a blower 24, which forces the air along a combustion air conduit 26 and through an air side 28 of a L'jungstrom type rotary heat exchanger 30. The air introduced through the conduit 26 is heated during its passage through the heat exchanger 30, and flows to a furnace 32. Fuel is introduced into the furnace 32 from a fuel source 34. The fuel burns in the intake air, producing combustion products known as flue gas. The flue gas contains a variety of constituents, including potential pollutants such as sulfur oxides (SOx), nitrogen oxides (NOx), and particulate matter resulting from combustion. The flue gas passes into a boiler 36 and through a steam generator 38. In the steam generator, water is vaporized to steam, which flows to a turbine 40. The turbine 40 is connected to an electrical generator that produces electrical power, the desirable product of the power plant 20.

The flue gas flows through a hot gas conduit 42 and into a flue gas side 44 of the heat exchanger 30. Heat transfer elements in the heat exchanger 30 are heated by the hot gas, and thereafter are rotated to the air side to transfer their heat to the combustion air in the combustion air conduit 26. After passing through the heat exchanger 30, the cooler flue gas enters a particulate collector 46, which typically is an electrostatic precipitator. The flue gas, from which most of the particulate is removed, is forced by a blower 48 up an exhaust stack 50 and to the atmosphere.

The preceding discussion has provided a general description of a power plant. Many aspects not relevant to the present invention have been omitted from the discussion. The present invention may also be used with other configurations of power plant, and FIG. 1 depicts only the preferred setting for practice of the invention.

A nitrogenous treatment agent, preferably urea, is injected into the hot flue gas in the boiler 36 from a treatment agent source 51. In the hot flue gas, the urea decomposes to produce ammonia. The ammonia in turn reacts with NOx in the flue gas by selective non-catalytic reduction (SNCR). This reaction consumes NOx and ammonia and produces nitrogen gas and water. The SNCR reaction occurs over a wide temperature range, but is preferably conducted at a temperature of from about 1600 F. to about 2000 F. as the flue gas flows along the hot gas conduit 42.

SNCR can reduce the NOx content only as far as permitted by the equilibrium conditions and the kinetics of the reaction. The ability to introduce large amounts of ammonia into the flue gas stream to increase the consumption of NOx by SNCR is also limited by ammonia slip, which is the passage of unreacted ammonia to the stack gas and thence to the environment. Ammonia is a toxic regulated substance, and it cannot be added in ever-increasing amounts to the flue gas for the purpose of SNCR, because a fraction of the added ammonia reaches the environment as a pollutant.

Within the ammonia emission limits imposed by ammonia slip, the NOx content of the flue gas is higher than desired after the SNCR reaction occurs. Additional NOx can therefore be removed by selective catalytic reduction (SCR). To accomplish SCR, the mixture of ammonia and flue gas is passed over a catalyst, which catalyzes the reaction between NOx and ammonia further toward completion at lower temperatures than for the SNCR. The SCR is preferably conducted at a temperature of from about 300 F. to about 950 F. in the presence of a material operable to catalyze the reaction of NOx and ammonia, preferably vanadia, tungsten, zeolite, noble metals, or transition metals. The catalyst is supported in a fixed catalyst bed 52. In order to gain more surface area for the catalyst, it may also be applied to hot-end heat transfer elements 54 of the rotary heat exchanger 30. For SNCR the urea is usually required in quantities in an excess to the stoichiometric ratio in relation to ammonia, so that some unreacted ammonia remains for the SCR reaction. A second treatment agent, preferably ammonia in gaseous form, may be injected from a source 56 into the flowing flue gas just upstream of the catalyst bed 52. The SCR results in the reaction of the ammonia and NOx in the flue gas so as to reduce both to acceptably low levels.

Figure 2:
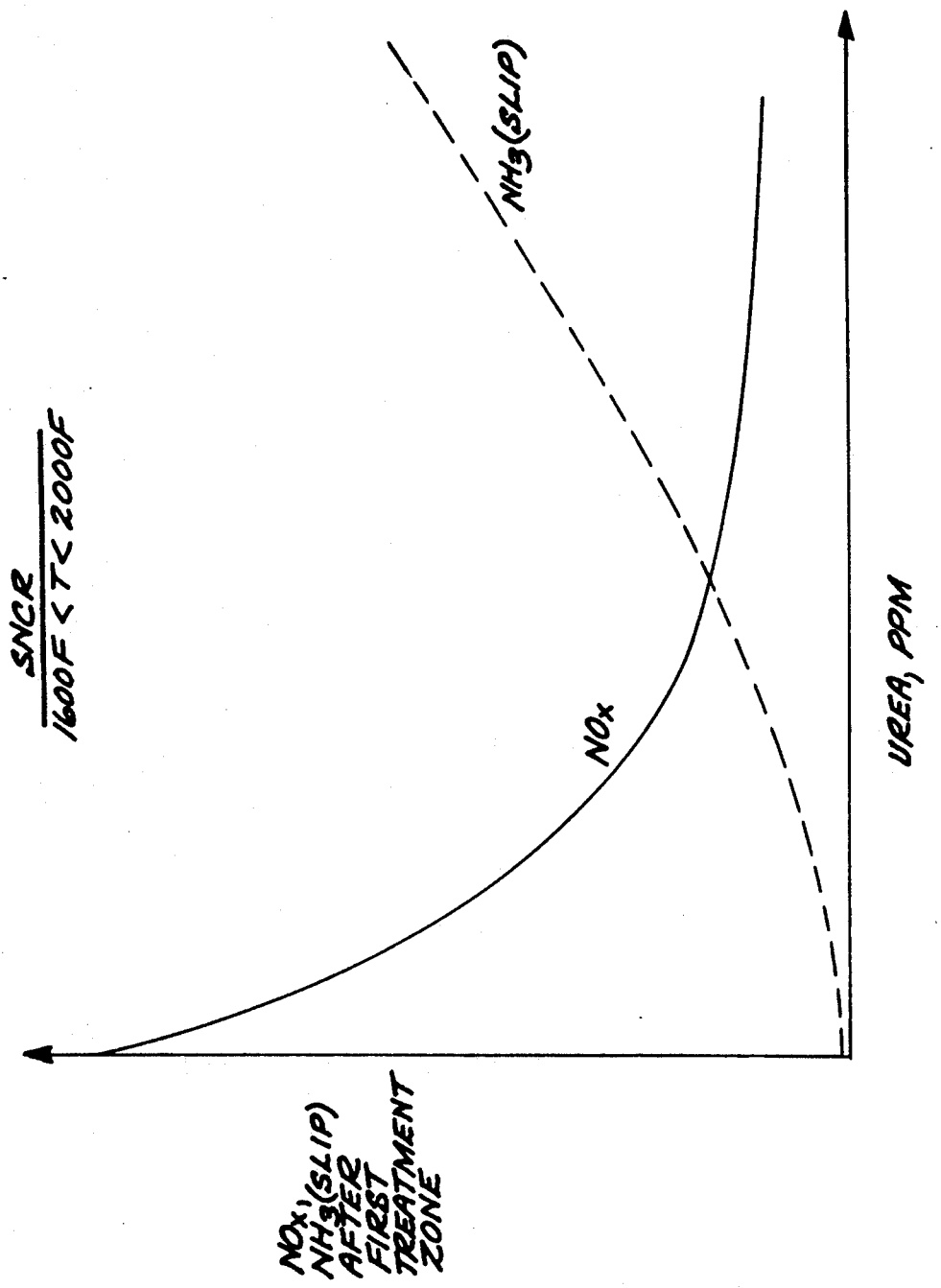
FIG. 2 is a graph of NOx and ammonia concentrations after the completion of SNCR as a function of added (treatment agent) urea concentration, for reaction temperatures less than 2000 F.
Figure 3:
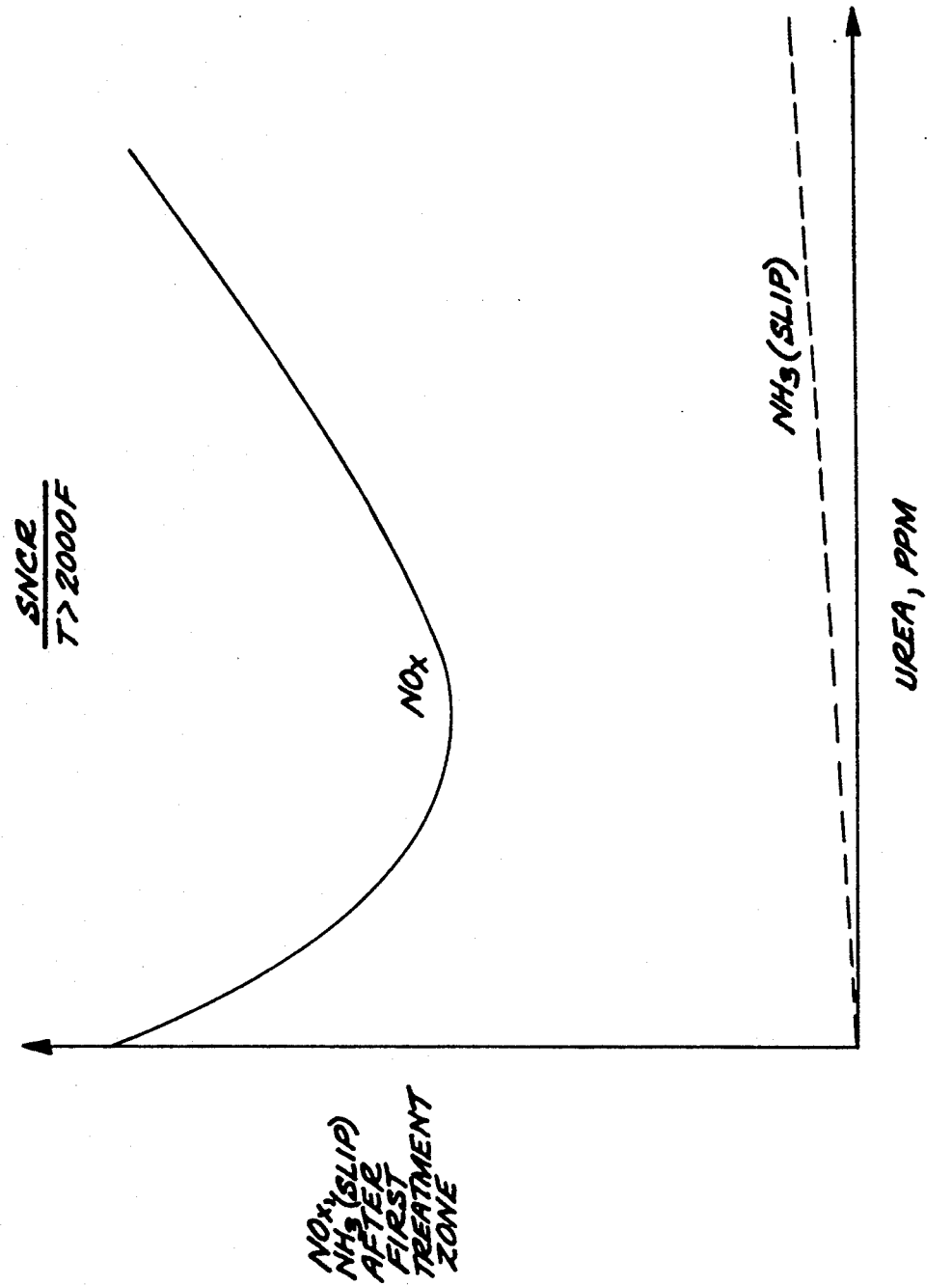
FIG. 3 is a graph of NOx and ammonia concentrations after the completion of SNCR as a function of added (treatment agent) urea concentration, for reaction temperatures of more than 2000 F.

As is now apparent, the concentrations of NOx and ammonia lost from the SNCR are interrelated to the urea addition. As shown in FIG. 2, in the temperature range of less than 2000 F. the NOx content decreases monotonically with increasing urea addition, while the ammonia slip increases with increasing urea addition. As shown in FIG. 3, at higher temperatures the NOx reaches a minimum value and then increases, with increasing urea additions.

Figure 4:
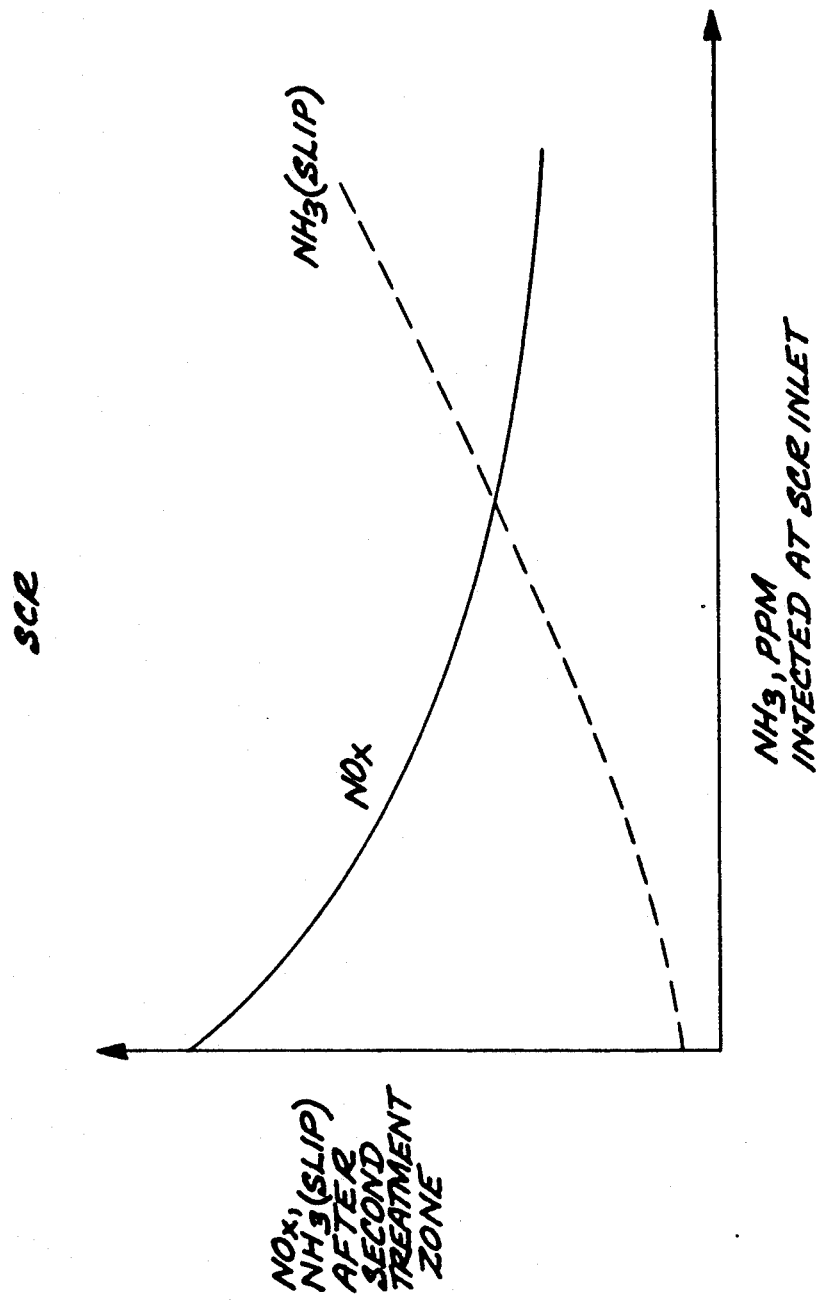
FIG. 4 is a graph of NOx and ammonia concentrations after the completion of SCR as a function of ammonia concentration at the inlet of the SCR process.

Similarly, the concentrations of NOx and ammonia slip from the SCR are related to the ammonia concentration at the inlet of the SCR process. As shown in FIG. 4, the NOx content decreases monotonically with increasing ammonia concentration at the inlet of the SCR process, while the ammonia slip increases. The observations of FIGS. 2-4 are useful in designing the control strategy for the combined use of SCR and SNCR.

The portion of the boiler 36 and hot gas conduit 42 having the proper temperature for SNCR, and in which the treatment agent is introduced, is termed a first treatment zone 58. The portion of the hot gas path having the catalyst in the flue gas stream, and in which the second treatment agent (if any) is introduced, is termed a second treatment zone 60. The second treatment zone 60 may be considered as having two subzones, one having the fixed bed catalyst 52 and the other having the catalyst supported on the heat transfer elements of the heat exchanger 30.

According to the present invention, detectors are provided to monitor the flue gas composition at several locations. A first NOx detector 62 is positioned in the hot gas conduit 42 upstream of the second treatment zone 60, and preferably between the first treatment zone 58 and the second treatment zone 60. The detector 60 senses the concentration and thence quantity of NOx in the flue gas stream at this point. An ammonia detector 64 is positioned in the hot gas conduit 42 downstream of the second treatment zone 60. FIG. 1 shows the detector 64 immediately downstream of the zone 60, but it could be farther downstream as far as the exhaust stack 50. The detector 64 senses the concentration and thence the quantity of ammonia in the flue gas stream after it has left the second treatment zone 60. This figure is termed the "ammonia slip". Optionally, a second NOx detector 66 is positioned downstream of the second treatment zone 60 in the hot gas conduit 42 or the stack 50. The detector 66 senses the concentration and thence the quantity of NOx in the flue gas stream after it has left the second treatment zone 60.

Instrumentation for use as the detectors 62, 64, and 66 is available commercially. The NOx detectors 62 and 66, as well as the ammonia detector 64, are preferably the Model 6000 emission monitoring system made by Air Instrument Measurements, Inc.

Control of the NOx reduction in the flue gas is achieved by using the results measured by the detectors 62, 64, and 66 to control the flows of treatment agents from the sources 51 and 56. Additionally, information on the amount of fuel consumed, termed the boiler load, and the combustion temperature, are provided. The analysis of the results of the detectors and the control of the sources is accomplished by a controller 68. The controller 68 preferably includes a microcomputer programmed to follow the control procedures discussed next.

Figure 5:
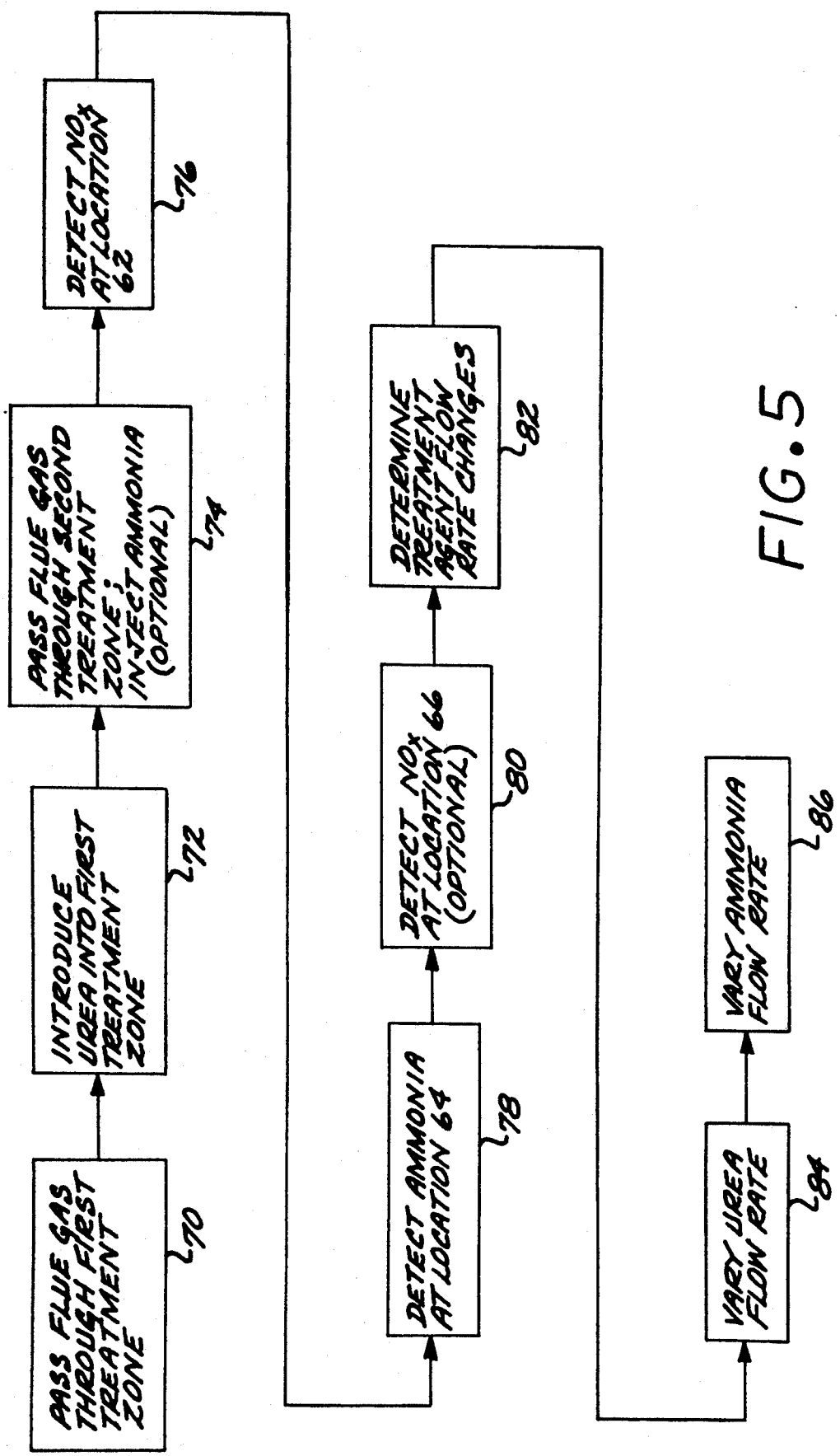
FIG. 5 is a process flow diagram for the control approach of the invention.

FIG. 5 depicts the process for removing NOx from the flow of flue gas. The flue gas is passed through the first treatment zone 58, numeral 70. The treatment agent, preferably urea, is introduced into the first treatment zone 58 to mix with the flue gas, numeral 72. The NOx in the flue gas then undergoes SNCR by reaction with the treatment agent. The flue gas, with a reduced NOx content, passes through the second treatment zone 60 to undergo SCR, numeral 74. Optionally, a second treatment agent, preferably ammonia, is added at the upstream end of the second treatment zone 60, numeral 74. The NOx content of the flue gas is detected by detector 62 between the first treatment zone 58 and the second treatment zone 60, numeral 76. The ammonia slip of the flue gas is detected by detector 64 after the flue gas leaves the second treatment zone 60, numeral 78. In this preferred embodiment, the NOx content of the flue gas is detected by detector 66 after the flue gas leaves the second treatment zone 60, numeral 80.

The measured values of the detectors 62, 64, and 66 are provided to the controller 68, and the changes in the flow rates of the treatment agents are determined, numeral 80. The details of the procedure are described subsequently in relation to FIGS. 2-4, but in general, the procedures are as follows. The quantity of urea added to the first treatment zone 58 is increased, so long as the following criteria are met: First, the quantity of NOx measured by detector 62, over a period of time, is generally decreasing with increasing additions of the treatment agent (i.e., a negative slope of the NOx-urea curve of FIG. 2 or FIG. 3), and, second, the quantity of ammonia measured at the detector 64, over a period of time, is generally below a predetermined maximum limit. On the other hand, if the quantity of NOx measured by detector 62, over a period of time, is generally increasing with increasing additions of the first treatment agent (i.e., a positive slope in the NOx-urea curve of FIG. 3), the urea addition rate is reduced.

Ammonia is added to the flue gas from source 56, so long as the following criteria are being met: First, the quantity of NOx measured at detector 62, over a period of time, is not generally decreasing with increasing additions of the treatment agent, and, second, the quantity of ammonia measured at detector 64, over a period of time, is generally below a predetermined maximum limit. The addition of the second treatment agent is increased as long as the quantity of NOx measured at detector 66, over a period of time, has not substantially reached (i.e., is greater than) a predetermined target control point. After these determinations have been made, the first treatment agent flow rate is responsively varied by controlling the source of the treatment agent 51, numeral 84, and the ammonia flow rate (if any) is responsively varied by controlling the ammonia source 56, numeral 86.

Figure 6:
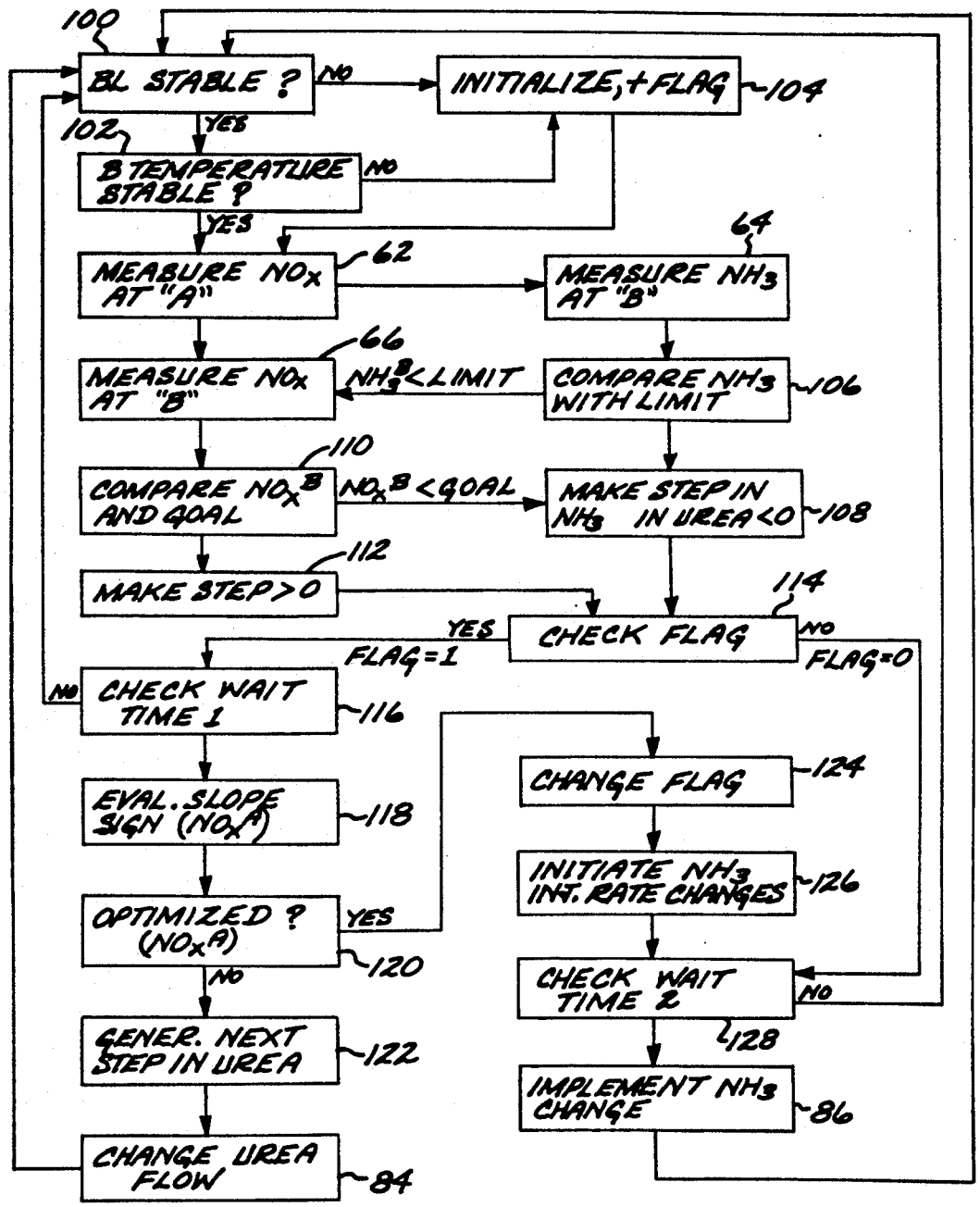
FIG. 6 is a process flow diagram for the iterative control procedure.

FIG. 6 depicts one procedure that may be used by the controller 68 in performing the determinations indicated at numeral 82, and the relation of these determinations to the determinations of gas content 62, 64, and 66, and the varying of the treatment agent, here urea 84, and ammonia 86. In general, this procedure provides that the treatment agent is added to the maximum extent possible, and changes in the addition of the treatment agent are the primary controlled quantity. The system performance is then trimmed with additions of the second treatment agent, if needed and permitted by the circumstances.

In this process, the boiler load is checked, numeral 100, and the combustion temperature is checked, numeral 102. If either is not stable, i.e., if either has changed since the last check, a FLAG is set to 1, numeral 104, to indicate that the selective noncatalytic reduction process must first be optimized. Otherwise, the FLAG remains as it was. In each case, readings are then taken from the detector 62 and the detector 64. The ammonia slip of the stack gas as measured by detector 64 is compared with a preestablished regulatory limit, numeral 106. If the ammonia slip is below the limit, the stack NOx content is measured, numeral 66. If the ammonia slip is not below the limit, a variable STEP which indicates the next change in a flow rate is set to a negative value, numeral 108. If the path through the NOx measurement, numeral 66 is followed, the stack NOx content is compared with a preestablished goal, numeral 110. If the stack NOx content as measured by detector 66 is less than the goal, the process proceeds to the setting of STEP to a negative value, numeral 108.

All paths pass through a check of the FLAG, numeral 114. If FLAG is 1, a preestablished waiting time after a change in the flow rate of the treatment agent is checked, numeral 116, and the change in the NOx content at detector 62 after a wait time is checked, numeral 118. The slope of the curve of NOx as a function of flow rate of the first treatment agent is thereby evaluated. If the slope is not between two preselected control points, the direction of the variation in the urea flow rate 51 (the previously established value of STEP) is selected, numeral 122, and the urea flow rate is varied, numeral 84. In the case where the slope is less than the lower preselected control point, STEP is set positive. If the slope is higher than the upper preselected control point, STEP is set negative. If the slope is between the two preselected control points, FLAG is set equal to zero, numeral 124, and a change in the ammonia flow rate 56 is initiated, numeral 126. After waiting a preselected amount of time, numeral 128, the ammonia flow rate change is implemented, numeral 86.

If FLAG is found to be zero at numeral 114, the process skips directly to numeral 128.

This entire control procedure then repeats continuously, controlling the urea and ammonia injection rates so that the NOx and ammonia are within established limits.

The approach of the invention provides a process for controlling the reduction of NOx in flue gas, while avoiding ammonia slip above established limits. It is usable on a variety of power plants and other combustion devices. Although a particular embodiment of the invention has been described in detail for purposes of illustration, various modifications may be made without departing from the spirit and scope of the invention. Accordingly, the invention is not to be limited except as by the appended claims.

What is claimed is:

1. A method of reducing NOx from a flow of flue gas produced by a burner, comprising the steps of:
   passing the flue gas through a first treatment zone;
   substantially simultaneously with said passing, selectively introducing a nitrogeneous treatment agent into the first treatment zone for the selective non-catalytic reduction of a first portion of the NOx from the flue gas passing through the first treatment zone, said introducing including an excessive amount of such nitrogeneous treatment agent above that required for such non-catalytic reduction of the first portion;
   passing the flue gas, containing such excessive amount of the nitrogeneous treatment agent, through a second treatment zone which includes a catalyst therein, wherein a second portion of the NOx within the flue gas is removed therefrom as a result of a reaction thereof with such nitrogeneous treatment agent or its derivatives in the presence of the catalyst;
   detecting the quantity of NOx in the flue gas intermediate the first and second treatment zones;
   detecting the quantity of ammonia in the flue gas exiting from the second treatment zone;
   increasing the quantity of nitrogeneous treatment agent introduced into the first treatment zone in response to said first and second mentioned detecting, so long as the following criteria are being met,
      A. the quantity of NOx indicated at said first mentioned detecting is generally decreasing with an increasing addition of the nitrogeneous treatment agent, and
      B. the quantity of ammonia detected at said second mentioned detecting is generally below a predetermined maximum limit.

2. A method as specified in claim 1, wherein the nitrogeneous treatment agent is a source of ammonia.

3. A method as specified in claim 1, wherein the nitrogeneous treatment agent is urea.

4. A method as specified in claim 1, wherein the steps of detecting are conducted substantially continuously.

5. A method as specified in claim 1, including the additional step of detecting the quantity of NOx in the flue gas exiting from the second treatment zone, said continuously increasing is in response to said last mentioned detecting, in addition to said first and second mentioned detecting, and said criteria to be met also include,
   C. the quantity of NOx indicated at said last mentioned detecting has not substantially reached a predetermined target point.

6. A method as specified in claim 1, including the additional step of
   introducing a second nitrogeneous treatment agent into the flue gas, said last mentioned introducing being downstream of the first treatment zone, and within or upstream of the second treatment zone.

7. A method as specified in claim 6, wherein the second nitrogeneous treatment agent is a source of ammonia.

8. A method as specified in claim 6, wherein the second nitrogeneous treatment agent is ammonia.

9. A method of reducing NOx from a flow of flue gas produced by a burner, comprising the steps of:
   passing the flue gas through a first treatment zone;
   substantially simultaneously with said passing, selectively introducing a nitrogeneous treatment agent into the first treatment zone for the selective non-catalytic reduction of a first portion of the NOx from the flue gas passing through the first treatment zone, said introducing including an excessive amount of such nitrogeneous treatment agent above that required for such non-catalytic reduction of the first portion;
   passing the flue gas, containing such excessive amount of nitrogeneous treatment agent, through a second treatment zone which includes a catalyst therein, wherein a second portion of the NOx within the flue gas is removed therefrom as a result of a reaction thereof with such excessive nitrogeneous treatment agent in the presence of the catalyst;
   detecting the quantity of NOx in the flue gas intermediate the first and second treatment zones;
   detecting the quantity of ammonia in the flue gas exiting from the second treatment zone;
   varying the treatment of the flue gas according to the steps of
      (i) increasing the quantity of nitrogeneous treatment agent introduced into the first treatment zone in response to said first and second mentioned detecting, so long as the following criteria are being met,
         A1. the quantity of NOx indicated at said first mentioned detecting is generally decreasing with an increasing addition of the nitrogeneous treatment agent, and
         B1. the quantity of ammonia detected at said second mentioned detecting is generally below a predetermined maximum limit,
      (ii) selectively introducing a second nitrogeneous treatment agent into the flue gas, said last mentioned introducing being downstream of the first treatment zone and within the second treatment zone, so long as the following criteria are being met,
         A2. the quantity of NOx indicated at said first mentioned detecting is not generally decreasing with an increasing addition of the nitrogeneous treatment agent, and B2. the quantity of ammonia detected at said second mentioned detecting is generally below a predetermined maximum limit.

10. A method as specified in claim 9, including the additional step of
    detecting the quantity of NOx in the flue gas exiting from the second treatment zone, said continuously increasing is in response to said last mentioned detecting, in addition to said first and second mentioned detecting, and said criteria to be met also include,
    C1. the quantity of NOx indicated at said last mentioned detecting has not substantially reached a predetermined target point.

11. A method as specified in claim 9, including the additional step of
    detecting the quantity of NOx in the flue gas exiting from the second treatment zone and, in response to such last mentioned detecting in addition to said first and second mentioned detecting, increasing the amount of second nitrogeneous treatment agent introduced so long as said criteria to be met further includes
    C2. the quantity of NOx detected at said last mentioned detecting has not substantially reached a predetermined target control point.

12. A method as specified in claim 9, wherein said second treatment zone includes at least two subzones therein,
    the first such subzone including a fixed catalyst therein, and
    the second subzone including a heat exchanger having at least some catalyst-coated heat transfer elements disposed within the flow path of the flue gas stream.

13. A method as specified in claim 12, wherein said first subzone is upstream of the second subzone.

14. A method as specified in claim 12 wherein said last mentioned introducing is upstream of the second subzone.

15. A method as specified in claim 12 wherein the second nitrogeneous treatment agent is introduced at a location substantially adjacent to the entry end of the flue gas stream into the first subzone.

16. A method as specified in claim 12, wherein the heat exchanger is a recuperative heat exchanger.

17. A method as specified in claim 12, wherein the heat exchanger is a regenerative heat exchanger.

18. A method as specified in claim 12, wherein the heat exchanger is a rotary wheel heat exchanger.

19. A method as specified in claim 10 wherein said second treatment zone includes at least two subzones therein, the first such subzone including a fixed catalyst therein and the second subzone includes catalyst-coated heat transfer elements carried on the fixed internal hub of a regenerative air heater which is in communication with a duct assembly which directs the flue gas therethrough.

20. A method as specified in claim 9, wherein the temperature of the flue gas in the first treatment zone is from about 1600 F. to about 2000 F.

21. A method as specified in claim 9, wherein the temperature of the flue gas in the second treatment zone is from about 300 F. to about 950 F.

22. A method of reducing NOx from a flow of flue gas produced by a burner, comprising the steps of:
    passing the flue gas through a first treatment zone;
    substantially simultaneously with said passing, selectively introducing a nitrogeneous treatment agent into the first treatment zone for the selective non-catalytic reduction of a first portion of the NOx from the flue gas passing through the first treatment zone, said introducing including an excessive amount of such nitrogeneous treatment agent above that required for such non-catalytic reduction of the first portion;
    passing the flue gas, containing such excessive amount of the nitrogeneous treatment agent, through a second treatment zone which includes a catalyst therein, wherein a second portion of the NOx within the flue gas is removed therefrom as a result of a reaction thereof with such nitrogeneous treatment agent or its derivatives in the presence of the catalyst;
    detecting the quantity of NOx in the flue gas intermediate the first and second treatment zones;
    detecting the quantity of ammonia in the flue gas exiting from the second treatment zone;
    varying the quantity of nitrogeneous treatment agent introduced into the first treatment zone in response to said first and second mentioned detecting, by
    increasing the quantity of nitrogeneous treatment agent added so long as the following criteria are being met,
        A1. the slope of NOx with increasing addition of the treatment agent at said first mentioned detecting is generally negative, and
        B1. the quantity of ammonia detected at said second mentioned detecting is generally below a predetermined maximum limit, and
    by decreasing the quantity of nitrogeneous treatment agent so long as the following criterion is met,
        C1. the slope of NOx with increasing addition of the treatment agent at said first mentioned detecting is generally positive; and
    selectively introducing a second nitrogeneous treatment agent into the flue gas, said last mentioned introducing being downstream of the first treatment zone and no later than the entry of the flue gas into the second treatment zone, so long as the following criteria are being met,
        A2. the slope of NOx with increasing addition of the treatment agent at said first mentioned detecting is not generally negative, and
        B2. the quantity of ammonia detected at said second mentioned detecting is generally below a predetermined maximum limit.

23. A method as specified in claim 22, including the additional step of
    detecting the quantity of NOx in the flue gas exiting from the second treatment zone, said continuously increasing is in response to said last mentioned detecting, in addition to said first and second mentioned detecting, and said criteria to be met also include,
    D1. the quantity of NOx indicated at said last mentioned detecting has not substantially reached a predetermined target point.

24. A method as specified in claim 22, including the additional step of
    detecting the quantity of NOx in the flue gas exiting from the second treatment zone and, in response to such last mentioned detecting in addition to said first and second mentioned detecting, increasing the amount of second nitrogenous treatment agent introduced so long as said criteria to be met further includes C2. the quantity of NOx detected at said last mentioned detecting has not substantially reached a predetermined target control point.

25. A method of reducing NOx from a flow of flue gas produced by a burner, comprising the steps of:

passing the flue gas through a first treatment zone and thereafter through a second treatment zone which includes a catalyst for the selective catalytic reduction of NOx in the flue gas;

controllably introducing a flow of a nitrogeneous treatment agent into the first treatment zone for the selective non-catalytic reduction of the NOx in the flue gas passing through the first treatment zone, the nitrogeneous treatment agent being introduced at a flow rate so as to minimize the quantity of NOx in the flue gas intermediate the first and second treatment zones, subject to the constraint that the quantity of ammonia in the flue gas exiting from the second treatment zone remain below a preselected value; and controllably introducing a flow of a second nitrogeneous treatment agent into the flue gas at a location between the two treatment zones, the second nitrogeneous treatment agent being introduced at a flow rate so as to further decrease the quantity of NOx in the flue gas exiting from the second treatment zone, subject to the constraint that the quantity of ammonia in the flue gas exiting from the second treatment zone remain below the preselected value.

26. A method as specified in claim 25, wherein the steps of controllably introducing a flow of a nitrogeneous treatment agent and controllably introducing a flow of a second nitrogeneous treatment agent are implemented incrementally, so that the flow rate of the nitrogeneous treatment agent is determined prior to the determination of the flow rate of the second nitrogeneous treatment agent.

27. A method as specified in claim 25, including the additional step, after the step of controllably introducing a flow of a second nitrogeneous treatment agent, of incrementally repeating the steps of controllably introducing a flow of a nitrogeneous treatment agent and controllably introducing a flow of a second nitrogeneous treatment agent.

* * * * *